(12) United States Patent
Rick

(10) Patent No.: US 6,811,393 B2
(45) Date of Patent: Nov. 2, 2004

(54) VALVE PIN CROSS OVER NOZZLE

(75) Inventor: Robert Rick, Weston (CA)

(73) Assignee: Stackteck Systems, Ltd., Ontario (CA)

( * ) Notice: Subject to any disclaimer, the term of this patent is extended or adjusted under 35 U.S.C. 154(b) by 162 days.

(21) Appl. No.: 10/315,308

(22) Filed: Dec. 10, 2002

(65) Prior Publication Data

US 2004/0071816 A1 Apr. 15, 2004

(30) Foreign Application Priority Data

Oct. 9, 2002 (CA) .............................................. 2407163

(51) Int. Cl.[7] .............................................. B29C 45/23
(52) U.S. Cl. ..................... 425/562; 425/563; 425/564
(58) Field of Search ................................. 425/562–566

(56) References Cited

U.S. PATENT DOCUMENTS

| | | | | |
|---|---|---|---|---|
| 4,212,626 A | * | 7/1980 | Gellert | 425/562 |
| 4,891,001 A | * | 1/1990 | Gellert | 425/562 |
| 5,458,843 A | * | 10/1995 | Brown et al. | 264/297.2 |
| 6,254,377 B1 | * | 7/2001 | Kazmer et al. | 425/562 |
| 6,287,107 B1 | * | 9/2001 | Kazmer et al. | 425/562 |
| 6,348,171 B1 | * | 2/2002 | Dewar et al. | 425/562 |
| 6,454,558 B1 | * | 9/2002 | Gellert | 425/562 |

* cited by examiner

*Primary Examiner*—Tim Heitbrink
(74) *Attorney, Agent, or Firm*—Herbert O'Toole; Nexsen Pruet, LLC

(57) ABSTRACT

According to the present invention, a cross over nozzle is provided of two parts which, when joined, define a housing having a passage extending therethrough, a tapered valve seat extending about the passage and a valve member having a tapered valve head disposed in the passage for engaging the valve seat. The two parts are axially separable at an interface extending through the valve seat/valve head. In order to open the valve, both valve parts are first joined and then moved together as one member in the same direction relative to the housing axially away from the valve seat. Similarly, the valve members are jointly moved into engagement with the valve seat before the cross over nozzle is separated. Accordingly, unlike the valve gate design, the valve interface between the two parts of the valve head isn't exposed to molten resin and therefore molten resin isn't trapped therebetween to cause a string upon opening.

7 Claims, 6 Drawing Sheets

VALVE PIN CROSS OVER NOZZLE

FIELD OF THE INVENTION

This invention relates generally to melt distribution arrangements for injection moulding apparatus. More particularly, this invention relates to cross over nozzle arrangements for multi-level stack moulds.

BACKGROUND OF THE INVENTION

In injection moulding apparatus utilizing a stack mould design, a melt transfer system is required which transfers melt across mould levels yet which is separable to enable mould separation. The separable component of the melt transfer system is referred to as a "cross over nozzle".

In order to be effective, a cross over nozzle is provided with some means for blocking melt flow upon separation. Prior art systems include a valve gate design such as described in U.S. Pat. No. 4,212,626, a hot probe design such as described in U.S. Pat. No. 4,891,001 and a valveless melt transfer system such as described in U.S. Pat. No. 5,458,843. Each such system has particular benefits for certain types of application. Each however typically drools or leaks in one way or another.

The valve gate design utilizes a pair of nozzles which are pressed up one against the other when the mould is closed with respective nozzle orifices in registry. Each nozzle orifice has a pin which can be advanced to block its respective orifice or retracted to unblock the orifice and permit melt flow. A disadvantage with this arrangement is that a positive driving force is required for the pin, which can be mechanical, pneumatic or hydraulic. The driving mechanisms typically require a considerable amount of space and accordingly such an arrangement may not be useable in some applications due to space constraints. There is also typically some stringing at the gate with such an arrangement. As the two pins open and close in a hot resin environment, hot resin may be trapped between the two pins causing a string to form when the mould is opened.

The hot probe design basically utilizes a heated nozzle tip to selectively allow the resin to solidify and block the nozzle or melt to free the nozzle. As it lacks a valve pin it has a tendency to drool heavily yet has the advantage of being compact and accordingly suited to an arrangement where space is limited.

The valveless melt transfer design includes an expansive chamber which captures melt during mould opening. This is an effective system which requires minimal shut height yet still causes some angel hair stringing.

It is an object of the present invention to provide a cross over nozzle arrangement with virtually no drool which can operate in a small volume similar to that of a valveless melt transfer system to enable its use on three and four-level stack mould systems.

BRIEF SUMMARY OF THE INVENTION

According to the present invention, a cross over nozzle is provided of two parts which, when joined, define a housing having a passage extending therethrough, a tapered valve seat extending about the passage and a valve member having a tapered valve head disposed in the passage for engaging the valve seat. The two parts are axially separable at an interface extending through the valve seat/valve head. In order to open the valve, both valve parts are first joined and then moved together as one member in the same direction relative to the housing axially away from the valve seat. Similarly, the valve members are jointly moved into engagement with the valve seat before the cross over nozzle is separated. Accordingly, unlike the valve gate design, the valve interface between the two parts of the valve head isn't exposed to molten resin and therefore molten resin isn't trapped therebetween to cause a string upon opening.

More particularly, a cross over nozzle is provided which has a nozzle housing with the melt passage extending therethrough, a valve axis extending along the passage and a tapered valve seat in the passage extending about the valve axis. The nozzle housing has a first housing part and a second housing part separable along the valve axis through the valve seat at a housing interface. A first valve seat part is carried by the first housing part and a second valve seat part is carried by the second housing part. A valve member having a tapered valve head is disposed in the passage and axially movable relative to the nozzle housing between a closed configuration wherein the valve head engages the valve seat to block melt flow along the passage and an open configuration wherein the valve head is displaced from the valve seat to allow melt flow along the passage about the valve head. The valve head has a first valve head part and a second valve head part which meet at a valve interface corresponding to the nozzle interface and at which the valve member is separable along the axis into first and second valve parts for respectively sealing the first and second nozzle parts in the closed configuration. A valve opening actuator acting between the valve member and the nozzle housing is provided for causing simultaneous movement of the first and second valve parts relative to the nozzle housing toward the open configuration when said first and second nozzle housing parts and first and second valve parts are joined. A first valve closing actuator is provided which acts between the first valve part and the first housing part to bias the first valve part toward its closed configuration. A second valve closing actuator is provided which acts between the second valve part and the second housing part to bias the second valve part towards its closed configuration.

According to one embodiment, the valve opening actuator may be a fluid pressure responsive first piston in a bore associated with a first housing part. A first valve stem may extend between and operably connect the first piston and the first valve head part. The first piston may also act as the first valve closing actuator. A fluid pressure responsive second piston and a second bore associated with a second housing part may act as the second valve closing actuator. A second valve stem may extend between and operably connect the second piston and the second valve head part.

According to an alternate embodiment, the first housing part may have a base part and an outer part which are telescopically connected for relative axial movement along the nozzle axis. A biasing means may act between the base part and the outer part to urge the outer part away from the base part. The first valve seat part may be carried by the outer part. A first valve stem may extend between and rigidly secure the first valve head part and the base part. The first valve head part may engage the seat to limit movement of the outer part away from the inner part. The valve opening actuator may cause movement of the second housing part toward the first housing part and act against the biasing means to urge the outer part of the first housing part toward the base part in turn causing relative movement of the valve head and valve seat to move the valve member into the open configuration. The biasing means between the base part and the outer part of the first housing part may also act as the first valve closing actuator. A second valve stem may extend between and operably connect the second valve head part with the second closing actuator.

The biasing means in the alternate embodiment described in the preceding paragraph may be at least one of a resilient biasing means and fluid pressure. The second valve closing actuator may be at least one of a resilient biasing means and a fluid pressure responsive piston in a bore associated with the second housing part.

BRIEF DESCRIPTION OF THE DRAWINGS

Preferred embodiments of the present invention are described below with reference to the accompanying drawings in which.

DETAILED DESCRIPTION OF THE INVENTION

Figure 1:
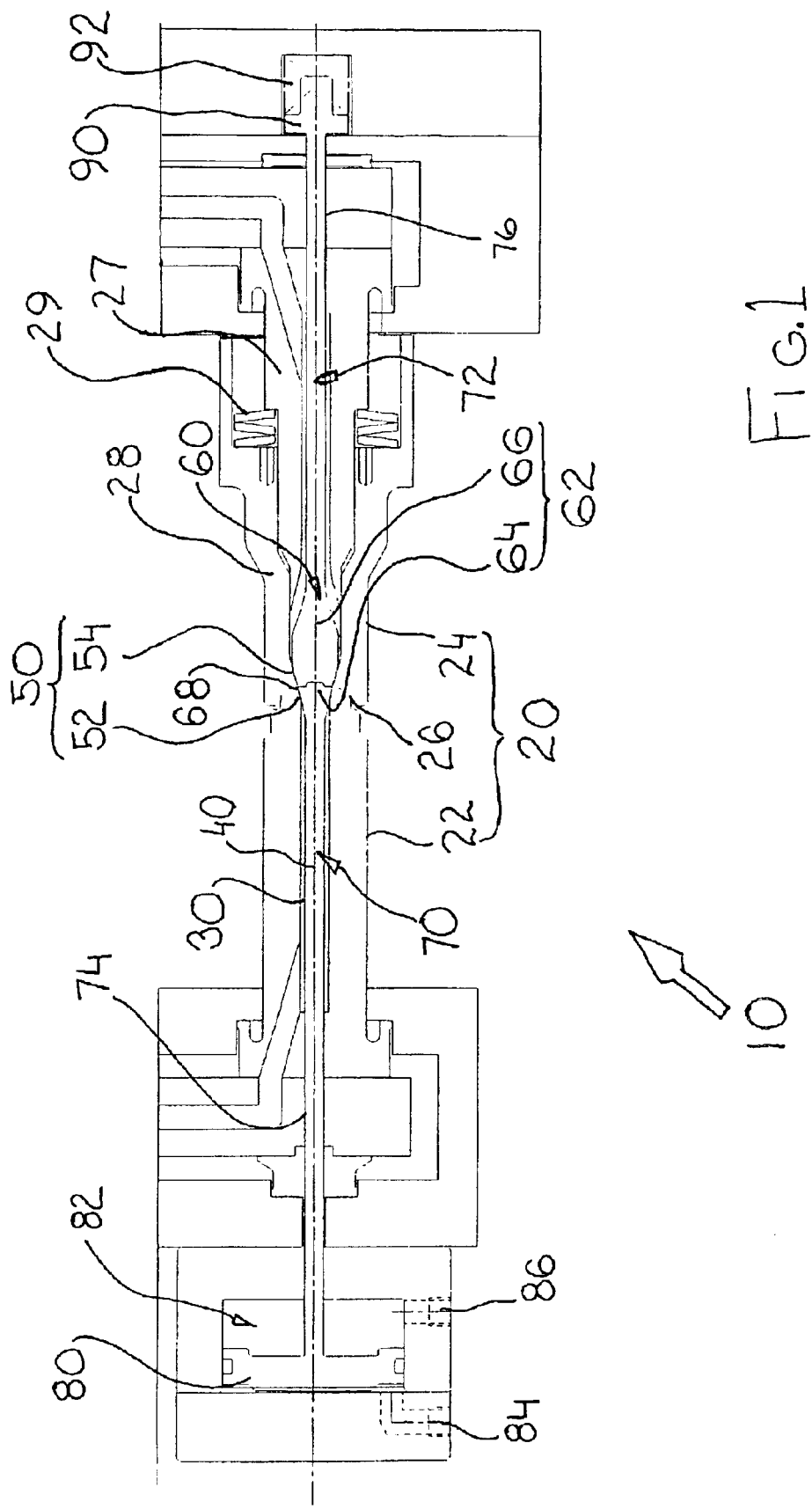
FIG. 1 is an axial sectional view of a cross over nozzle according to the present invention in its closed and joined configuration.
Figure 2:
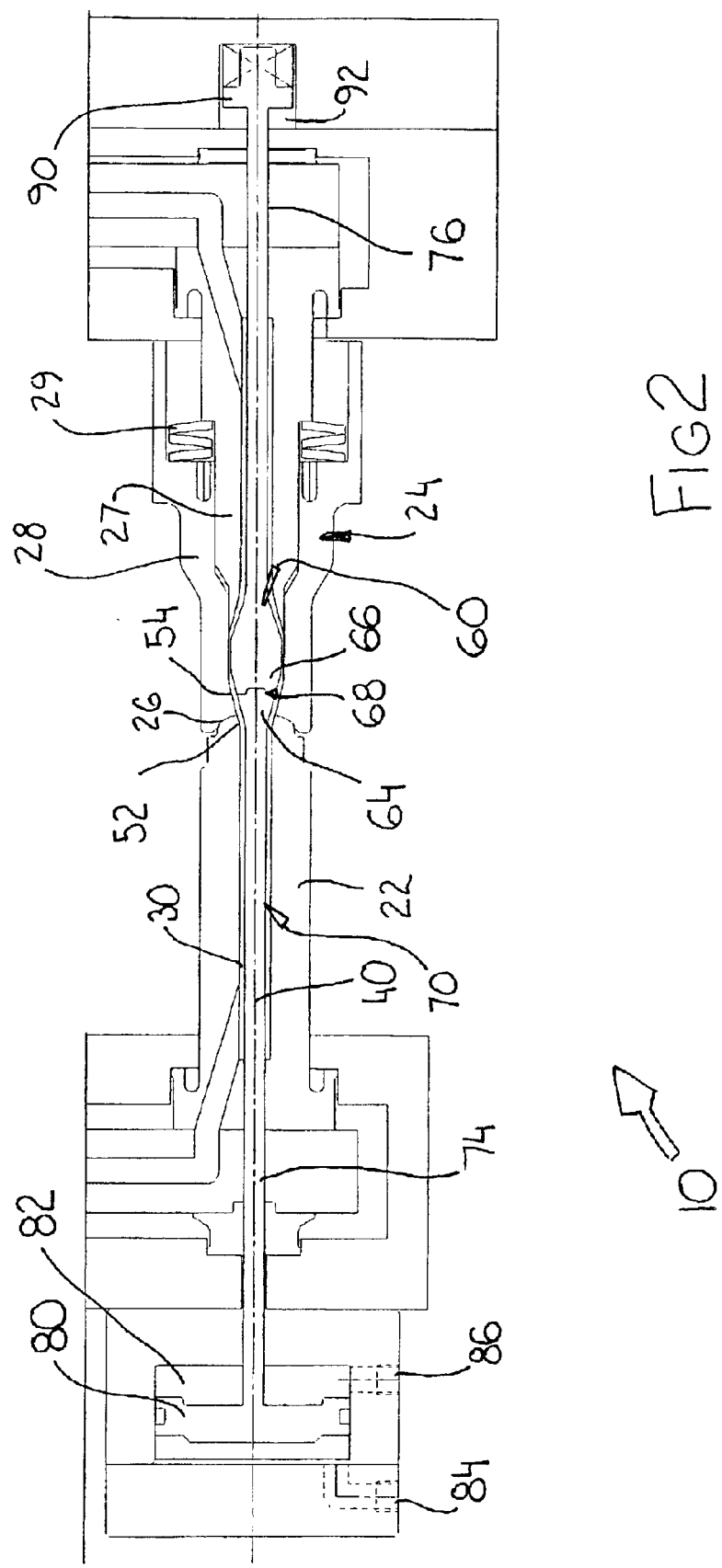
FIG. 2 is an axial sectional view corresponding to FIG. 1 but showing the cross over nozzle in its open configuration.
Figure 3:
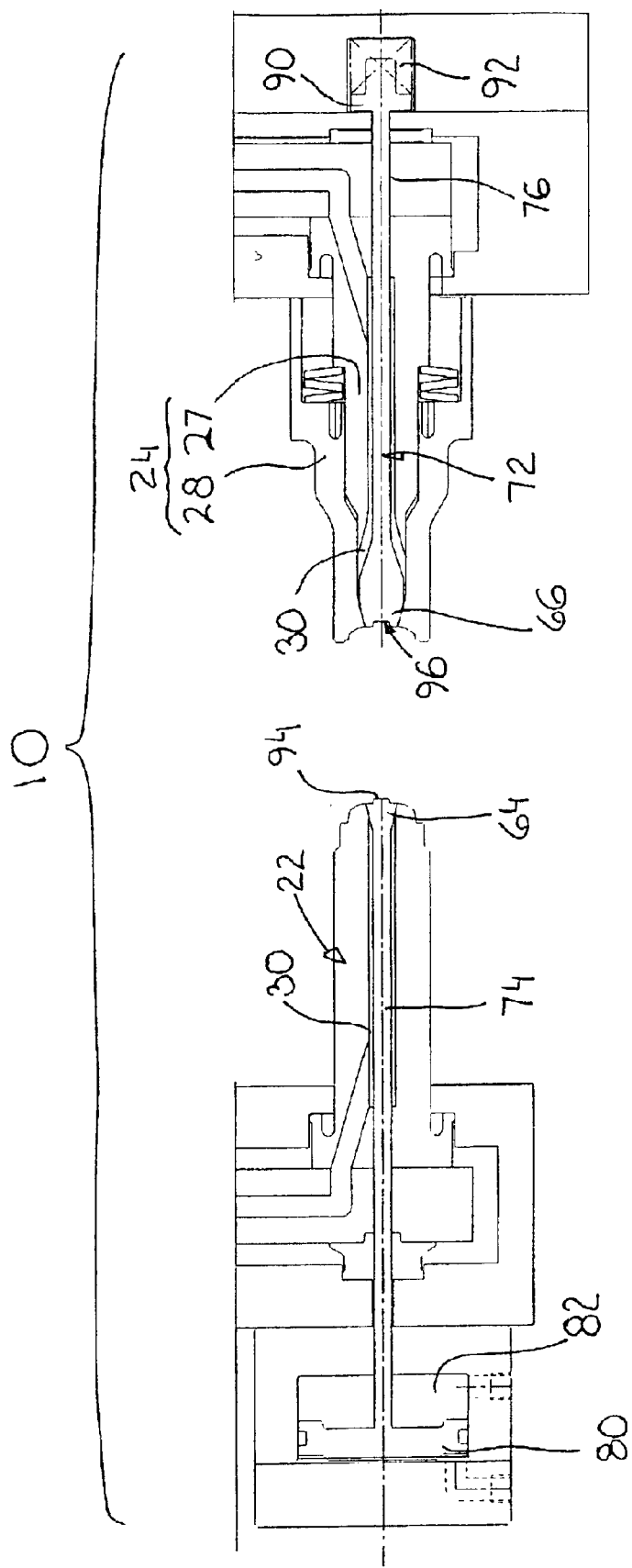
FIG. 3 is an axial sectional view of the cross over nozzle of FIG. 1 in a closed and separated configuration.

A first embodiment of a valved cross over nozzle according to the present invention is generally indicated by reference 10 in FIGS. 1 through 3.

A melt passage 30 extends through the nozzle housing 20. A valve axis 40 extends along the melt passage 30 and a tapered valve seat 50 extends about the valve axis 40.

The cross over nozzle 10 has a nozzle housing 20 with a first housing part 22 (to the left as illustrated) and a second housing part 24 (to the right as illustrated).

The first housing part 22 and the second housing part are separable along the valve axis 40 through the valve seat 50 at a housing interface 26. FIG. 3 illustrates the nozzle housing 20 in a separated configuration. A first valve seat part 52 is carried by the first housing part 22 and a second valve seat part 54 is carried by the second housing part 24.

A valve member 60 having a tapered valve head 62 is disposed in the passage 30 and is axially movable relative to the nozzle housing 20 between a closed configuration as illustrated in FIG. 1 and an open configuration as illustrated in FIG. 2. In the closed configuration the valve head 62 engages the valve seat 50 to block melt flow along the passage 30. In the open configuration the valve head 62 is displaced from the valve seat 50 to allow melt flow along the passage 30 about the valve head 62.

The valve head 62 has a first valve head part 64 and a second valve head part 66. The first valve head part 64 and second valve head part 66 meet at a valve interface 68 which corresponds to and is aligned with the nozzle interface 26. The valve member 60 is separable at the valve interface 68 along the valve axis 40 into first and second valve parts 70 and 72 respectively. The first valve part 70 and its associated first valve head part 64 act to seal the first nozzle part 22. The second valve part 72 and its associated second valve head part 66 act to seal the second nozzle part 24.

A valve opening actuator in the form of a fluid pressure responsive first piston 80 in a bore 82 is operably connected to the first valve head part 64 by a valve stem 74 in the FIGS. 1 through 3 embodiment. Alternate valve opening actuator assemblies may be utilized as for example discussed below with respect to the FIGS. 4 through 6 embodiment.

The first piston 80 is axially slidable in its bore 82 in response to fluid pressure applied through either of two fluid ports 84 and 86 respectively. The introduction of fluid (air or hydraulic fluid typically) will cause the first piston 80 to move to the right as illustrated and in turn move the valve stem 74 and first valve head part 64 to the right. The first valve head part in turn presses against the second valve head part 66 and as a result the whole valve head 60 is unseated from the valve seat 50 to move the valve member 40 into its open configuration as illustrated in FIG. 2. As the first valve head part 64 and second valve head part 66 are in contact during the valve member 60 being in its open configuration, molten resin isn't provided with an opportunity to flow between the two parts 64 and 66 respectively.

Once an injection cycle is complete and it is necessary to separate the mould, the valve member 60 is advanced to the left as illustrated into the closed configuration of FIG. 1. This may be achieved by initially using a second valve closing actuator in the form of a fluid pressure responsive second piston 90 slidably mounted in a second bore 92 associated with the second nozzle part 24. The second piston 90 is operably connected to the second valve head part 66 by a second valve stem 76. In lieu of a fluid pressure responsive piston, a resilient biasing means such as a stack of Belleville™ washers may be used as the second valve closing actuator. Other actuator arrangements may occur to persons skilled in such structures.

Once the valve member 60 has been moved to the closed configuration a first closing actuator is used to maintain the first valve head part 64 against the first valve seat part 62. The first closing actuator may also be the piston 80, but with fluid pressure applied through the port 86 rather than the port 84 to urge the piston 80 and in turn the first valve stem 74 and first valve head part 64 to the left as illustrated. At this point the nozzle housing 20 and the valve member 60 can be parted at the nozzle interface 26 and the valve interface 68 as illustrated in FIG. 3. As no molten resin has been trapped between the first valve head part 64 and the second valve head part 66, the separation will be clean as compared to that of a valve gate design.

In order to align the first valve head part 64 with the second valve head part 66 when the nozzle housing 20 is joined, cooperating locating means may be provided. Suitable locating means may for example be a projection 94 on the first valve head part 64 which is received by and nests in a corresponding recess 96 on the second valve head part 96. Obviously other arrangements are possible such as using a plurality of projections 94 and recesses 96 and reversing the projection 94 and recess 96 as between the first valve head part 64 and the second valve head part 66.

To reduce shock on opening and closing, the second housing part 24 may be made up of an inner part 27 and a cover 28 which are telescopically connected albeit for a relatively small amount of movement relative to each other along the valve axis 40. A cushioning means 29 such as the stack of Belleville™ washers illustrated acts to bias the cover 28 to the left as illustrated away from the inner part 27. Accordingly the initial shock of joining of the first housing part 22 and second housing part 26 is absorbed by the cover 28 yielding slightly to the right as illustrated against the force of the cushioning means 29. Obviously the amount of telescopic movement between the inner part 27 and cover 28 mustn't exceed the stroke of the second closing actuator to avoid having the cushioning means 29 unseat the second valve head part 66 from the second valve head part 54.

Figure 4:
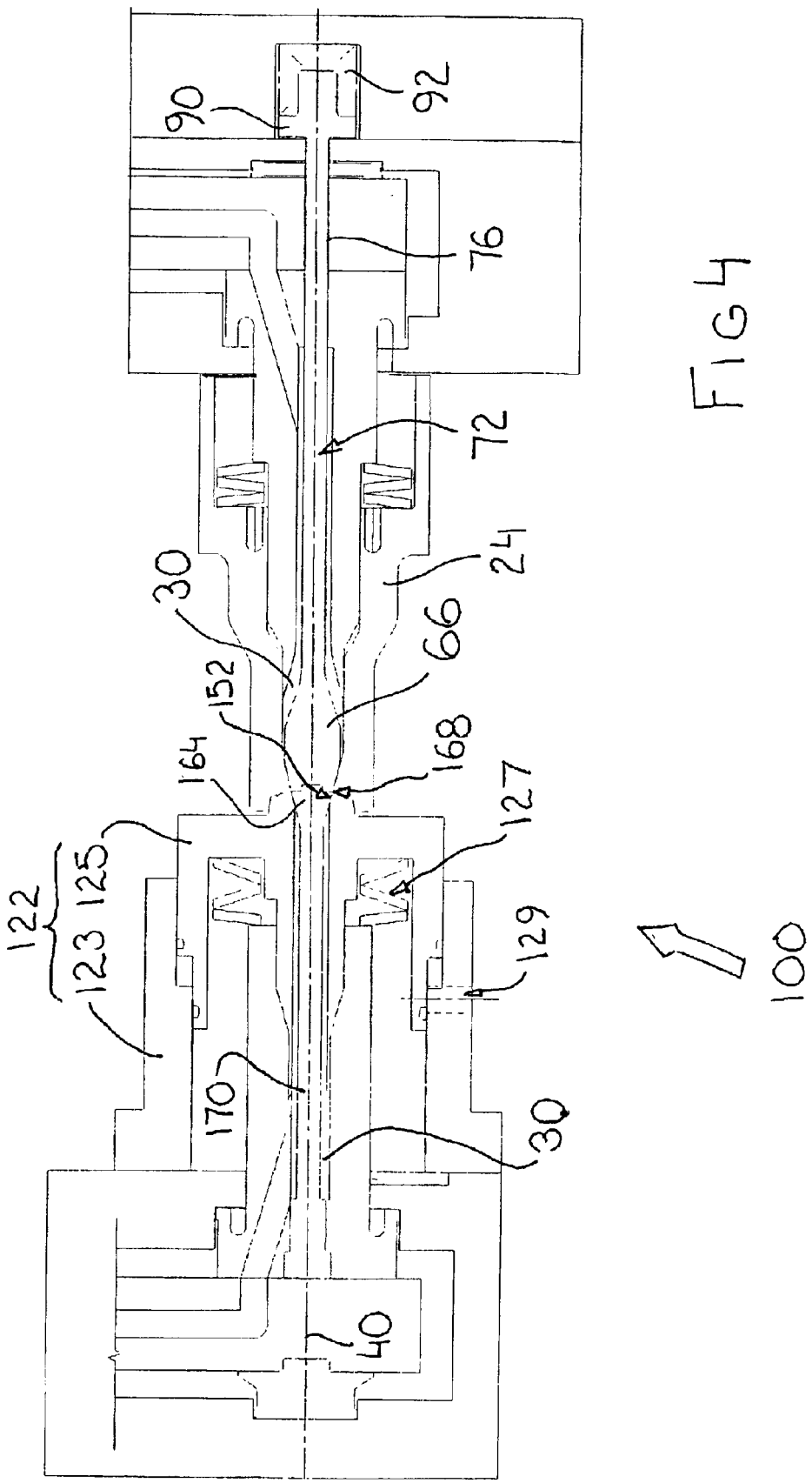
FIG. 4 is an axial sectional view of an alternate embodiment of a cross over nozzle according to the present invention in a closed and joined configuration.
Figure 5:
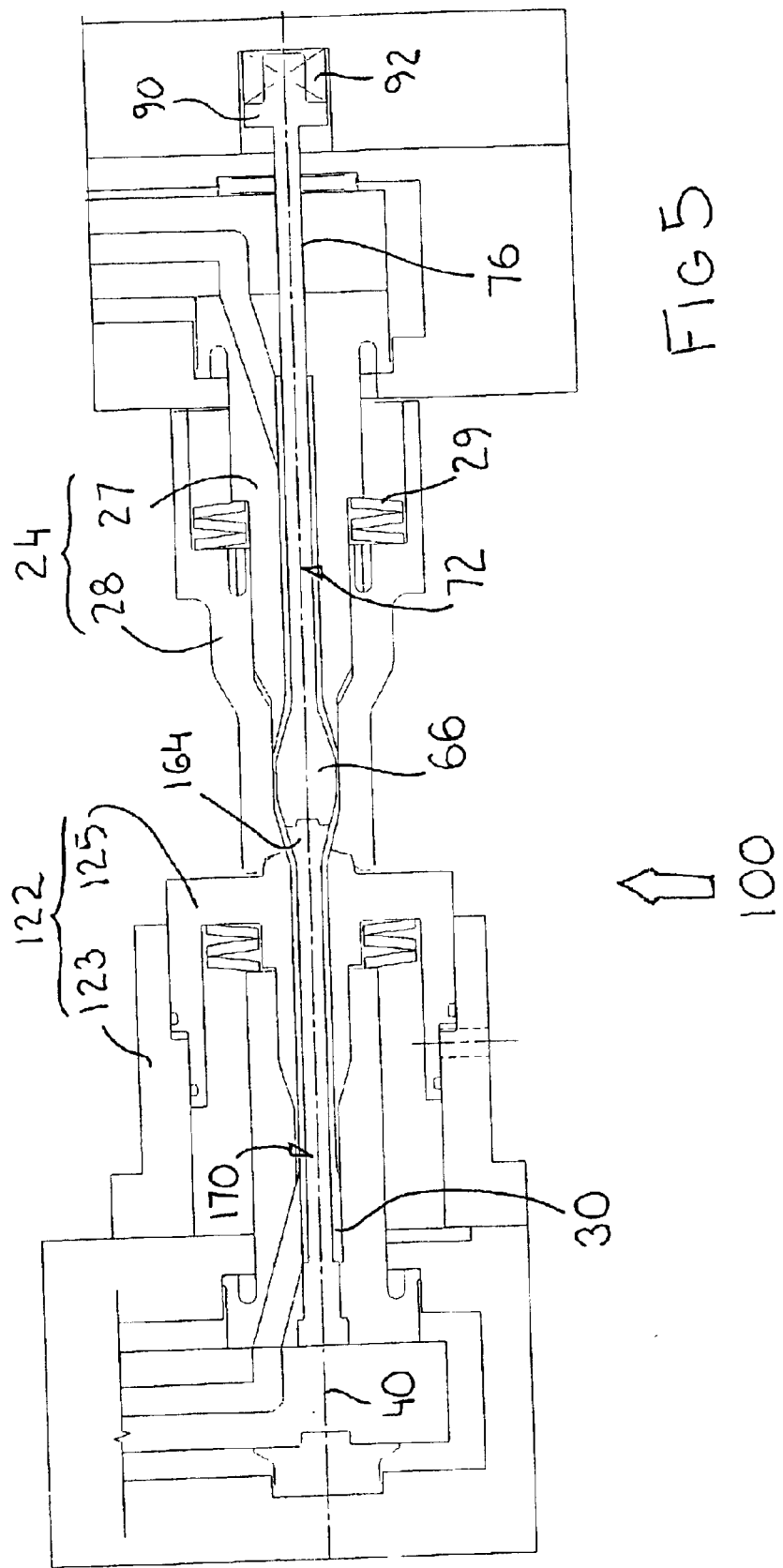
FIG. 5 is an axial sectional view of the cross over nozzle of FIG. 4 in a joined and open configuration.
Figure 6:
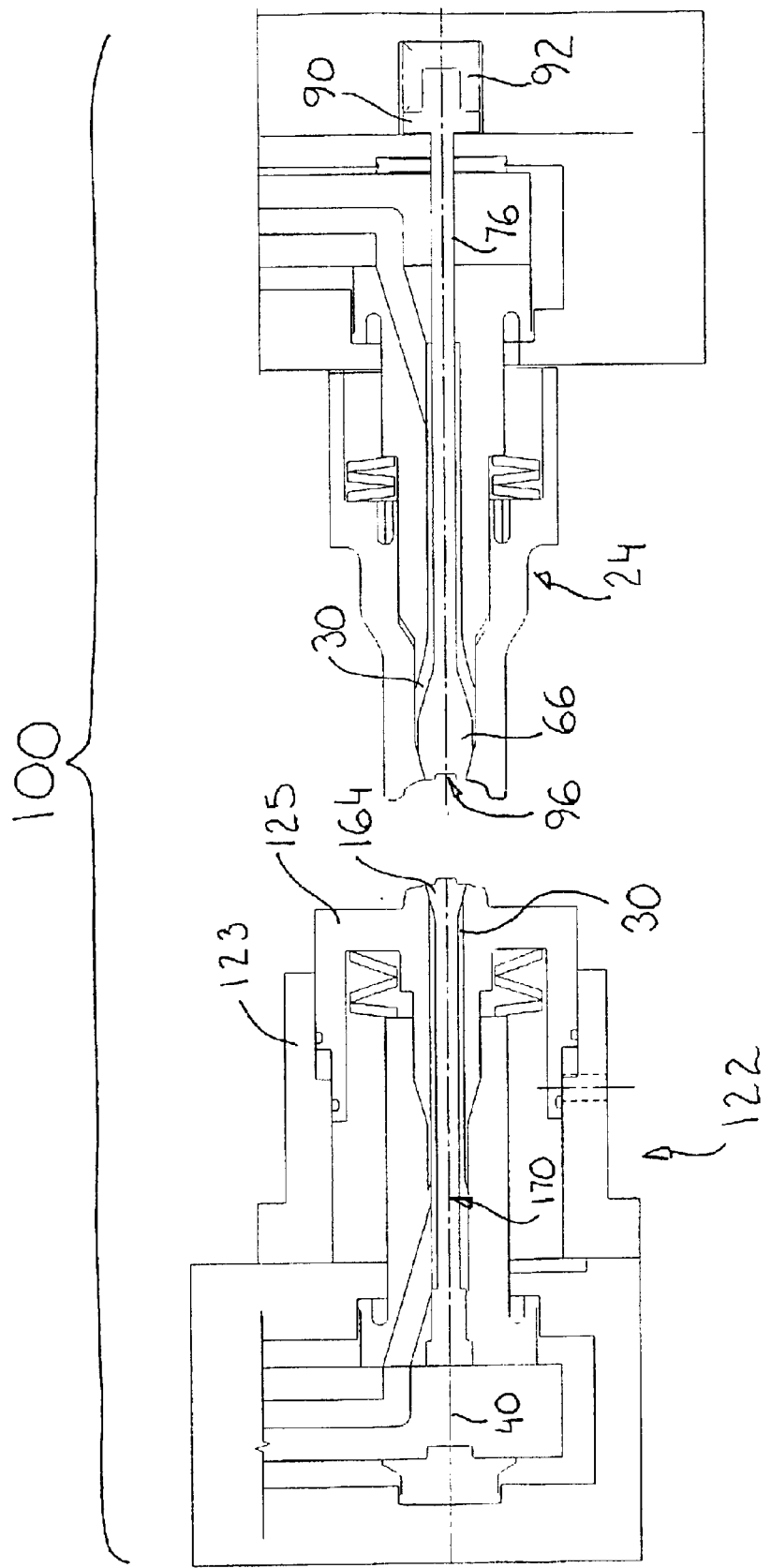
FIG. 6 is an axial sectional view of the cross over nozzle of FIG. 4 in a closed and separated configuration.

An alternate embodiment of a valved cross over nozzle according to the present invention is illustrated and generally indicated by reference 100 in FIGS. 4 through 6. The differences between the FIGS. 4 through 6 embodiment and the FIGS. 1 through 3 embodiment reside in the first housing part and accordingly common reference numerals for the second housing part 24, its components and the associated second valve part 60 and its components are used throughout and the foregoing description applies. The basic operational principles are common to both embodiments, namely a two part cross over nozzle is provided with a tapered valve head which engages a tapered valve seat in a nozzle passage, the nozzle is separable through the valve head and seat into two independently sealable valve head and seat parts and the valve head parts are joined and moved in unison between an open and a closed configuration.

In the FIGS. 4 through 6 embodiment a first housing part 122 includes a base part 123 and an outer part 125 which are telescopically connected for relative movement along (i.e. parallel to) the valve axis 40. A biasing means such as either the stack of Belleville™ washers 127 or pressurized fluid introduced through a fluid port 129 act between the base part 123 and the outer part 125 to urge the outer part 125 away from the base part 123 (i.e. to the right as illustrated).

A first valve stem 170 extends between and rigidly secures a first valve head part 164 to the base part 123. The first valve head part 164 in turn engages a first valve seat part 152 to limit movement of the outer part 125 away from the inner part 123. Other stop means could be provided but using the first valve head part 164 in combination with the first valve stem 170 ensures sealing engagement between the first valve head part 164 and the first valve seat part 152 at the limit of travel of the outer part 125 away from the base part 123.

In the FIGS. 4 through 6 embodiment, the valve opening actuator is in effect the mould closing structure (which is not illustrated) that moves the mould levels and in turn the two halves of the cross over nozzle toward one another. As can be seen by comparing FIGS. 4 and 5, as the second housing part 23 presses up against the first housing part 122, the outer part 125, which carries the first valve seat part 152 is moved (to the left as illustrated) axially toward the base part 123. As the first valve head part 164 remains in its position by virtue of its rigid securement to the base part 123 through the first valve stem 170, the first valve seat part 152 moves away from the first valve head part 164 to move the valve member toward its open configuration. As the first valve head part 164 and the second valve head part 66 are joined at a valve interface 168 before and during valve opening and closing, and moved simultaneously in the same direction, no molten resin is trapped therebetween.

During mould separation the first housing part 122 and second housing part are moved away from each other the biasing means acting between the base part 123 and outer part 125 acts as a first valve closing actuator by causing relative movement of the first valve seat part 152 and first valve head part 164 back into engagement. The second valve closing actuator (i.e. the piston 90 in the bore 92) are simultaneously employed to maintain joinder of the first valve head part 164 and the second valve head part 66.

As the first valve head part 164 and the second valve head part are sealed respectively against the first valve seat part 152 and second valve seat part 54 before separation to block the flow of molten resin, a clean separation can be effected.

An advantage of the FIGS. 4 through 6 embodiment is that it can be set up using resilient biasing means in lieu of fluid pressure responsive biasing means for all of the opening and closing actuation to achieve a totally automatic self energized closing and opening sequence without the need for a pneumatic or hydraulic hook-up or synchronization of a pneumatic or hydraulic actuator with mould opening and closing sequences.

The above description is intended in an illustrative rather than a restrictive sense. Variations to the specific structure described may be apparent to persons skilled in the art without departing from the spirit and scope of the present invention which is defined by the claims set out below.

We claim:

1. A valved cross over nozzle comprising:

a nozzle housing with a melt passage extending therethrough, a valve axis extending along said passage and a tapered valve seat in said passage extending about said valve axis;

said nozzle housing having a first housing part and a second housing part separable along said valve axis through said valve seat at a housing interface, with a first valve seat part being carried by said first housing part and a second valve seat part being carried by said second housing part;

a valve member having a tapered valve head disposed in said passage and axially movable relative to said nozzle housing between a closed configuration wherein said valve head engages said valve seat to block melt flow along said passage and an open configuration wherein said valve head is displaced from said valve seat to allow melt flow along said passage about said valve head;

said valve head having a first valve head part and a second valve head part which meet at a valve interface corresponding to said nozzle interface and at which said valve member is separable along said axis into first and second valve parts for respectively sealing said first and second nozzle parts in said closed configuration;

a valve opening actuator acting between said valve member and said nozzle housing for causing simultaneous movement of said first and second valve head parts relative to said nozzle housing toward said open configuration when said first and second nozzle housing parts and first and second valve parts are joined;

a first valve closing actuator acting between said first valve head part and said first housing part to bias said first valve head part toward its closed configuration; and, a second valve closing actuator acting between said second valve head part and said second housing part to bias at least said second valve head part toward its closed configuration.

2. The cross over nozzle of claim 1 wherein:

said valve opening actuator is a fluid pressure responsive first piston in a bore associated with said first housing part;

a first valve stem extends between and operably connects said piston and said first valve head part;

said first piston further acts as said first valve closing actuator;

a fluid pressure responsive second piston in a bore associated with said second housing part acts as said second valve closing actuator; and, a second valve stem extends between and operably connects said second piston and said second valve head part.

3. The cross over nozzle of claim 1 wherein:

said first housing part has a base part and an outer part which are telescopically connected for relative axial movement along said valve axis;

a biasing means acts between said base part and said outer part to urge said outer part away from said base part;

said first valve seat part is carried by said outer part;

a first valve stem extends between and rigidly secures said first valve head part and said base part;

said first valve head part engages said first valve seat part to limit movement of said outer part away from said inner part;

said valve opening actuator causes movement of said second housing part toward said first housing part and acts against said biasing means to urge said outer part of said first housing part toward said base part in turn causing relative movement of said valve head and said valve seat to move said valve member into said open configuration;

said biasing means between said base part and said outer part of said first housing part acts as said first valve closing actuator;

a second valve stem extends between and operably connects said second valve head part with said second closing actuator.

4. The cross over nozzle of claim 3 wherein:

said biasing means is at least one of a resilient biasing means and fluid pressure; and, said second valve closing actuator is at least one of a resilient biasing means and a fluid pressure responsive piston in a bore associated with said second housing part.

5. The cross over nozzle of claim 1, 2, 3 or 4 wherein:

said first valve head part and said second valve head part are provided with cooperating locating means to align said first and second valve head parts when said first and second valve head parts are joined.

6. The cross over nozzle of claim 5 wherein:

said locating means include at least a projection and a corresponding recess for receiving the projection.

7. The cross over nozzle of claim 5 wherein:

said second housing part includes an inner part and a cover which are telescopically connected for relative movement therebetween parallel to said valve axis by an amount not exceeding a stroke of said second closing actuator;

said second valve seat part is carried by said cover;

a cushioning means acts between inner part and said cover to urge said inner part and said cover apart and yields upon joining of said first and second housing parts to cushion an initial joining impact therebetween.

\* \* \* \* \*